United States Patent Office 3,012,064
Patented Dec. 5, 1961

3,012,064
PREPARATION OF MONOESTERS OF POLYHYDRIC ALCOHOLS
Leander A. Hertling, St. Louis, and Robert W. Radue, Webster Groves, Mo., assignors to Monsanto Chemical Company, St. Louis, Mo., a corporation of Delaware
No Drawing. Filed Mar. 28, 1957, Ser. No. 648,990
9 Claims. (Cl. 260—474)

This invention relates to monoesters derived from polyhydric alcohols and monocarboxylic acids, i.e., esters in which one of the hydroxy groups of a polyhydric alcohol is esterified with the carboxy group of a monocarboxylic acid, and, more particularly, in an alcoholysis reaction between a polyhydric alcohol and an ester of a monocarboxylic acid to produce such monoesters, this invention relates to a method wherein an alkali metal alcoholate used in the alcoholysis reaction is neutralized with gaseous anhydrous hydrogen halide prior to separation of unreacted polyhydric alcohol and said polyhydric alcohol monoester from the alcoholysis reaction mixture.

An alcoholysis reaction is usually conducted in the presence of a catalyst in order to accelerate the esterification. Although many different catalysts have been employed in the prior art for an alcoholysis reaction, the most commonly used catalysts are alkali metal alcoholates. Small concentrations of these catalysts cause the esterification to take place rapidly even at room temperature.

Alcoholysis is not limited to monohydric alcohols, but can also be performed using polyhydric alcohols. However, in an alcoholysis reaction wherein the alcohol employed is a polyhydric alcohol and the reaction is performed in the presence of an alkali metal alcoholate, the process has the disadvantages that, even though the desired monoester of the polyhydric alcohol is formed, a large amount of diester is also formed, as well as other undesired reaction products. In addition, separation of the desired monoester from the reaction mixture, in the presence of the alkali metal alcoholate, causes further formation of undesired products, thus reducing the yield of monoester, particularly where heat is employed to effect such separation as by distillation.

Furthermore, the presence of water during the alcoholysis reaction, during the separation of excess alcohol, or during the recovery of the ester produced by the reaction causes substantial losses of the desired ester, primarily through hydrolysis of ester to acid.

The prior art shows methods of neutralizing the alcoholysis reaction mixture prior to separation of excess polyhydric alcohol and ester with such materials as concentrated aqueous hydrochloric acid and sulfuric acid. However, these methods have many disadvantages; for example, although the catalyst may be destroyed, the water of these acids promotes hydrolysis and thus loss of the desired monoester, and due to the difficulty of determining when sufficient acid has been added to effect neutralization, the addition of excess acid increases the rate of undesirable condensation and hydrolysis.

It has now been found that exceptionally high yields of the polyhydric alcohol monoester of monocarboxylic acids can be obtained from the alcoholysis reaction of polyhydric alcohols with esters of monocarboxylic acids in the presence of an alkali metal alcoholate catalyst by neutralizing the alcoholysis reaction mixture with gaseous anhydrous hydrogen halide prior to the separation of the unreacted polyhydric alcohol and the monoester from the reaction mixture, thus effecting the entire reaction, i.e., alcoholysis, neutralization and separation, under anhydrous conditions and therefore overcoming the disadvantages of the methods known to the prior art. In the preferred practice of the invention, gaseous hydrogen halide is added in an amount calculated to be in slight excess over the amount needed to react with the alkali metal alcoholate catalyst. Then, upon the application of heat or reduced pressure or both, such as can be used to separate excess alcohol and ester, the gaseous hydrogen halide is first completely and immediately removed from the alcoholysis reaction mixture, thus preventing undesired reactions which would otherwise occur. Thereafter, the neutralized reaction mixture is subjected to a process for separating the monoester in substantially pure form.

In addition, after separation of the desired monoester, any polyester which is formed can be subjected to alcoholysis with the polyhydric alcohol, in the presence of an alkali metal alcoholate, which converts the polyester to the desired monoester. However, in order to effect a satisfactory recovery of the monoester thus formed, it is necessary to neutralize the alcoholysis reaction mixture and to maintain an anhydrous system; otherwise, in trying to effect separation, as for example, by distillation, polyesterification and hydrolysis will be promoted. Thus, by application of the invention, i.e., neutralization of the alcoholysis reaction mixture with gaseous anhydrous halogen halide, the catalyst is rendered ineffective and an anhydrous system is maintained.

Further applications of the method of the invention will be obvious to those skilled in the art.

Polyhydric alcohols which can be used in the process of this invention are those polyhydric alcohols having at least one hydroxy group attached to a primary carbon atom and at least one other hydroxy group which can be attached to a primary or secondary carbon atom (i.e., a non-tertiary carbon atom) and include, among others, ethylene glycol, 1,2-propanediol, 1,3-propanediol, 1,2-butanediol, 1,3-butanediol, 1,2-pentanediol, 1,4-butanediol, 1,5-pentanediol, 1,6-hexanediol, and glycerol, as well as other isomeric butane-, pentane-, and hexanediols having one hydroxy group attached to a primary carbon atom and at least one additional hydroxy group attached to a primary or secondary carbon atom. Polyhydric ether alcohols, such as diethylene glycol and dibutylene glycol, among others, can also be employed as the polyhydric alcohol reactant.

Examples of alkali metal alcoholates suitable for use in the process of this invention are the sodium, potassium, or lithium alcoholates, sodium methylate, sodium ethylate, sodium butylate, potassium methylate, and potassium butylate, as well as an alkali metal alcoholate of the polyhydric alcohol which is to be esterified in the reaction. Generally, although these catalysts are prepared separately and then added to the reaction mixture, they can be effectively prepared in situ by the addition of metallic sodium, potassium or lithium to the alcoholysis reaction mixture.

The gaseous anhydrous halogen halides which are suitable for use in the process of this invention are hydrogen fluoride, hydrogen chloride, hydrogen bromide, and hydrogen iodide.

Examples of monoesters of polyhydric alcohols which can be prepared in high yields by alcoholysis reaction between a polyhydric alcohol and an ester of a monocarboxylic acid, followed by neutralization of the alkali metal alcoholate catalyst with gaseous anhydrous hydrogen halide, are ethylene glycol monobenzoate, ethylene glycol monosalicylate, ethylene glycol monogentisate, ethylene glycol 2-methyl-monobenzoate, ethylene glycol 2 - hydroxy - 3 - methyl-monobenzoate, 2 - hydroxypropyl salicylate, 3-hydroxybutyl benzoate, 4-hydroxybutyl-2-hydroxy-3-phenyl benzoate, 6-hydroxyhexyl gallate, diethylene glycol monosalicylate, ethylene glycol monoacetate, glycerol monopropionate, etc.

The following examples further illustrate the method of this invention.

Example 1

To a suitable reaction vessel fitted with a distillation head, a device for stirring reactants in the vessel, means for measuring temperature of the reaction mixture within the vessel, and a means for heating and cooling the reaction vessel, there are added 310 parts by weight of ethylene glycol and 1.5 parts by weight of sodium methylate. The resulting mixture is stirred and heated to about 100° C. at 200 mm. Hg. Thereafter 152 parts by weight of methyl salicylate are added slowly over a period of about 3 hours. The resulting reaction mixture is held at a temperature of from about 100 to 105° C. for about 2½ hours at pressure slowly being decreased to about 155 mm. Hg and for an additional ½ hour at about 106° C. at about 70 mm. Hg. During the addition of methyl salicylate and thereafter, methanol is formed and removed from the reaction mixture.

The remaining reaction mixture is cooled to about 30° C. and neutralized with gaseous anhydrous HCl. The neutralized mixture is distilled at 1.5 mm. Hg to first recover the unreacted ethylene glycol and thereafter to recover ethylene glycol monosalicylate.

By this process there is recovered 151 parts by weight of ethylene glycol monosalicylate, assaying 99.7% and having a crystallization point of 26.1° C. The yield of the monosalicylate based on the ethylene glycol consumed, taking credit for the glycol recovered, is 95.5% based on the actual consumption of 54 parts by weight of ethylene glycol.

Example 2

The process described in Example 1 is repeated employing 360.5 parts by weight of 1,2-butanediol, 136 parts by weight of methyl benzoate, 9.0 parts by weight of a solution, about 18%, of sodium butylate in butanol. During the addition of methyl benzoate, methanol and butanol are recovered.

The resulting reaction mixture is cooled to about 30° C. and neutralized with gaseous anhydrous HCl. The resulting neutralized mixture is subjected to distillation at about 10 mm. Hg to recover unreacted 1,2-butanediol and then to a second distillation at about 4 mm. Hg to recover the 2-hydroxybutyl benzoate.

By this process there are obtained 280 parts by weight of unreacted 1,2-butanediol and 165 parts by weight of 2-hydroxybutyl benzoate.

Example 3

The process of Example 1 is repeated employing 520 parts by weight of 1,5-pentanediol, 196 parts by weight of isopropyl gentisate, and 9 parts of the solution of sodium butylate dissolved in butanol hereinbefore described. The isopropyl gentisate is added slowly over a period of about 3 hours to the reaction mixture which initially contained only the 1,5-pentanediol and sodium butylate. After all the isopropyl gentisate is added, the reaction temperature is increased slowly over a period of about 2 hours to about 116° C. and the reaction pressure is decreased to about 56 mm. Hg. Substantially all of the butanol and the isopropanol split out during the reaction is recovered in the first 3 hours of reaction. The resulting reaction mixture is cooled to about room temperature and neutralized with gaseous anhydrous HBr.

The neutralized reaction mixture is distilled at about 4 mm. Hg. By this process there are obtained about 426 parts by weight of 1,5-pentanediol and about 192 parts by weight of 5-hydroxypentyl gentisate.

Example 4

The process of Example 1 is repeated employing 343 parts by weight of 1,2-propanediol, 137 parts by weight of methyl salicylate, and 9 parts by weight of the 18% solution of sodium butylate in butanol. All of the reactants are combined and heated at a pressure of 200 mm. Hg to a reaction temperature of about 97° C., at which time methanol begins distilling from the reaction. To speed up the removal of methanol and butanol from the reaction mixture, the reaction temperature is slowly increased to about 118° C. and the pressure is maintained at about 202 mm. Hg. After about an hour of reaction time, the amount of methanol distilling out of the reaction mixture begins to diminish and the pressure is decreased over a period of about 30 minutes to about 55 mm. Hg. The reaction mixture is held at a temperature of about 115° to about 120° C. and at a pressure of about 55 mm. Hg for about 2 hours. Thereafter the resulting reaction mixture is cooled to about room temperature and then neutralized with gaseous anhydrous HCl. The neutralized reaction mixture is distilled at about 10 mm. Hg to recover unreacted 1,2-propanediol and thereafter distilled at about 4 mm. Hg to recover 2-hydroxypropyl salicylate.

By the process above described there are recovered 275 parts by weight of unreacted 1,2-propanediol and 149 parts by weight of 2-hydroxypropyl salicylate.

Example 5

The process of Example 1 is repeated using 450 parts by weight of 1,3-butanediol, 166 parts by weight of methyl-3-methyl salicylate, and 1.5 parts by weight of sodium methylate. The resulting reaction mixture is cooled to about 30° C. and neutralized with gaseous anhydrous HCl. After neutralization, unreacted 1,3-butanediol and 3-hydroxybutyl-2-hydroxy-3-methyl benzoate are recovered by distillation at reduced pressure.

Example 6

The process of Example 1 is repeated using 310 parts by weight of ethylene glycol, 88 parts by weight of ethyl acetate, and 1.5 parts by weight of sodium methylate.

The resulting reaction mixture is cooled to about 30° C. and neutralized with gaseous anhydrous HCl. After neutralization, unreacted ethylene glycol and ethylene glycol monoacetate are recovered by distillation at reduced pressure.

Example 7

The still residue from an alcoholysis reaction between ethylene glycol and methyl salicylate, containing 67 parts by weight of ethylene glycol disalicylate, is added to reaction equipment similar to that described in Example 1 along with 69 parts by weight of ethylene glycol and 4 parts by weight of an 18% solution of sodium butylate in butanol. The mixture is heated to about 90° C. and then the temperature is raised slowly, over a period of about 3 hours, to about 123° C. Heating is discontinued at the end of about 3½ hours and the reaction mixture is neutralized with gaseous anhydrous HCl. After neutralization, unreacted ethylene glycol is recovered and thereafter ethylene glycol monosalicylate is recovered by distillation under reduced pressure.

By this method there are produced 79 parts by weight of ethylene glycol monosalicylate, which is a yield, based on the amount of ethylene glycol disalicylate charged, of 98% of the theoretical amount.

As hereinbefore stated, the specific examples set forth are intended to be illustrative of the process of this invention and not to as a limitation thereon, for the precise proportion set forth in the examples may be varied and, as further illustrated, other equipment reactants may be employed without departing from the spirit and scope of this invention as set forth in the appended claims.

What is claimed is:

1. In an alcoholysis reaction between a polyhydric alcohol and an ester of a monocarboxylic acid in the presence of an alkali metal alcoholate to produce a monoester of said polyhydric alcohol, the step comprising neutralizing the alcoholysis reaction mixture with gaseous anhydrous hydrogen halide prior to separation of unreacted polyhydric alcohol and said monoester of said polyhydric alcohol.

2. In an alcoholysis reaction between a diprimary dihydric alcohol and an ester of a monocarboxylic acid in the presence of an alkali metal alcoholate to produce a monoester of said diprimary dihydric alcohol, the step comprising neutralizing the alcoholysis reaction mixture with gaseous anhydrous HCl prior to separation of unreacted diprimary dihydric alcohol and said monoester of said diprimary dihydric alcohol.

3. In an alcoholysis reaction between ethylene glycol and an ester of a monocarboxylic acid in the presence of an alkali metal alcoholate to produce a monoester of ethylene glycol, the step comprising neutralizing the alcoholysis reaction mixture with gaseous anhydrous HCl prior to separation of unreacted ethylene glycol and said monoester of said ethylene glycol.

4. In an alcoholysis reaction between ethylene glycol and an ester of benzoic acid in the presence of a sodium alcoholate catalyst to produce ethylene glycol monobenzoate, the step comprising neutralizing the alcoholysis reaction mixture with gaseous anhydrous HCl prior to separation of ethylene glycol and said ethylene glycol monobenzoate.

5. In an alcoholysis reaction between ethylene glycol and an alkyl ester of salicylic acid in the presence of a sodium alcoholate catalyst to produce ethylene glycol monosalicylate, the step comprising neutralizing the alcoholysis reaction mixture with gaseous anhydrous HCl prior to separation of unreacted ethylene glycol and said ethylene glycol monosalicylate.

6. In an alcoholysis reaction between ethylene glycol and ethylene glycol disalicylate in the presence of a sodium alcoholate catalyst to produce ethylene glycol monosalicylate, the step comprising neutralizing the alcoholysis reaction mixture with gaseous anhydrous HCl prior to the separation of unreacted ethylene glycol and said ethylene glycol monosalicylate.

7. In an alcoholysis reaction between ethylene glycol and methyl salicylate in the presence of a sodium alcoholate catalyst to produce ethylene glycol monosalicylate, the step comprising neutralizing the alcoholysis reaction mixture with gaseous anhydrous HCl prior to separation of unreacted ethylene glycol and said ethylene glycol monosalicylate.

8. In an alcoholysis reaction between ethylene glycol and methyl salicylate in the presence of sodium butylate catalyst to produce ethylene glycol monosalicylate, the step comprising neutralizing the alcoholysis reaction mixture with gaseous anhydrous HCl prior to separation of unreacted ethylene glycol and said ethylene glycol monosalicylate.

9. In an alcoholysis reaction between ethylene glycol and methyl salicylate in the presence of sodium methylate catalyst to produce ethylene glycol monosalicylate, the step comprising neutralizing the alcoholysis reaction mixture with gaseous anhydrous HCl prior to separation of unreacted ethylene glycol and said ethylene glycol monosalicylate.

References Cited in the file of this patent

UNITED STATES PATENTS

| | | |
|---|---|---|
| 2,170,030 | Malm et al. | Aug. 22, 1939 |
| 2,298,186 | Woodhouse et al. | Oct. 6, 1942 |
| 2,342,612 | Hansley | Feb. 22, 1944 |
| 2,465,319 | Whinfield et al. | Mar. 22, 1949 |
| 2,822,348 | Haslam | Feb. 4, 1958 |